United States Patent
Ihm et al.

(10) Patent No.: US 8,275,062 B2
(45) Date of Patent: Sep. 25, 2012

(54) USER SCHEDULING METHOD IN MULTIPLE ANTENNA SYSTEM

(75) Inventors: Bin Chul Ihm, Anyang-si (KR); Intae Hwang, Gwangju (KR); Cheolwoo Yoo, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 756 days.

(21) Appl. No.: 12/382,292

(22) Filed: Mar. 12, 2009

(65) Prior Publication Data

US 2009/0232235 A1 Sep. 17, 2009

(30) Foreign Application Priority Data

Mar. 13, 2008 (KR) .......................... 10-2008-0023294

(51) Int. Cl.
*H04B 7/02* (2006.01)
*H04L 1/02* (2006.01)
(52) U.S. Cl. .................. 375/267; 375/260; 375/295
(58) Field of Classification Search .................. 375/267, 375/260, 295
See application file for complete search history.

(56) References Cited

U.S. PATENT DOCUMENTS

| | | | | |
|---|---|---|---|---|
| 7,609,671 | B1 * | 10/2009 | Nuriyev et al. | 370/328 |
| 7,813,313 | B2 * | 10/2010 | Pan et al. | 370/328 |
| 2004/0063468 | A1 * | 4/2004 | Frank | 455/561 |
| 2006/0268769 | A1 * | 11/2006 | Pan et al. | 370/328 |
| 2007/0042720 | A1 * | 2/2007 | Pan et al. | 455/69 |
| 2008/0025336 | A1 * | 1/2008 | Cho et al. | 370/432 |

* cited by examiner

*Primary Examiner* — Shuwang Liu
*Assistant Examiner* — Nader Bolourchi
(74) *Attorney, Agent, or Firm* — McKenna Long & Aldridge LLP (57) ABSTRACT

A user scheduling method includes: determining a maximum temporary user set of a maximum capacity among temporary user sets obtained from combinations of M number of active users; and transmitting data to users belonging to the maximum temporary user set via multiple antennas by using a preceding matrix and a weight matrix with respect to the maximum temporary user set. Users to actually receive data can be selected from among active users in a multi-antenna system, and a corresponding precoding matrix and a weighting matrix can be obtained.

9 Claims, 7 Drawing Sheets

USER SCHEDULING METHOD IN MULTIPLE ANTENNA SYSTEM

CROSS-REFERENCE TO RELATED APPLICATIONS

This application claims the benefit of priority of Korean Patent Application No. 10-2008-0023294 filed on Mar. 13, 2008 which is incorporated by reference in its entirety herein.

BACKGROUND

1. Field of the Invention

The present invention relates to wireless communication and, more particularly, to a user scheduling method in a multi-antenna system.

2. Description of the Related Art

Due to generalization of information communication services and the advent of various multimedia services and quality services, demand for communication services is increasing. To meet the demand, diverse wireless communication technologies are under study in multiple sectors.

A multi-input multi-output (MIMO) technique receives attention as a scheme for enhancing link reliability and preventing interference as well as having high frequency efficiency. The MIMO technique can increase a diversity gain by allowing signals transmitted via multiple transmit antennas to have independence.

The MIMO scheme obtains gain through diverse precoding such as beamforming or space time coding. The space time coding may be divided, for example, into a space time block coding (STBC) and a space time trellis coding (STTC). The STBC obtains diversity by appropriately adjusting the same stream for each transmit antenna during one transmission period. With the STBC, system diversity is increased linearly in proportion to the number of antennas, but the throughput does not increase. The STTC is a scheme for determining a signal to be transmitted next based on Trellis coding, which has a more complexity than the STBC. In the MIMO system, a diversity gain and a spatial multiplexing gain appear differently according to a channel environment. In a room with a large angle spread of a reception signal or in a sufficient scattering environment, the diversity gain can be maximized through space time coding, while in an environment in which the angle spread of a reception signal is small and a line-of-sight (LOS) is guaranteed, throughput can be maximized through the space multiplexing scheme. In other words, because demands of users to be met vary depending on the situations of users, those demands cannot be satisfied 100% with solely the STC scheme or solely the SDM scheme.

Meanwhile, besides the MIMO scheme, an adaptive modulation and coding (AMC) scheme is frequently used to enhance performance of the system. The AMC scheme is a technique of increasing link performance by adjusting a transmission power level, a modulation order and/or a code rate in a transmitter by using channel state information (CSI). Throughput is allowed to be increased when a channel state is good, and allowed to be lowered in the occurrence of channel degradation, to thereby support effective transmission, and resultantly, an average throughput can be increased.

In the MIMO system employing various preprocessing (preceding) and AMC scheme, user scheduling does matter. With available radio resources limited, which users should be selected from among those in a cell and which radio resources should be allocated to the selected users are problematic to obtain maximum performance, for which, thus, user scheduling is considered.

SUMMARY

Therefore, an object of the present invention is to provide a user scheduling method in a multi-antenna system.

According to the user scheduling method in a multi-antenna system of the present invention, users to actually receive data can be selected from among active users in a multi-antenna system, and a corresponding preceding matrix and a weighting matrix can be obtained.

DETAILED DESCRIPTION OF THE INVENTION

Exemplary embodiments of the present invention will now be described in detail with reference to the accompanying drawings.

Figure 1:
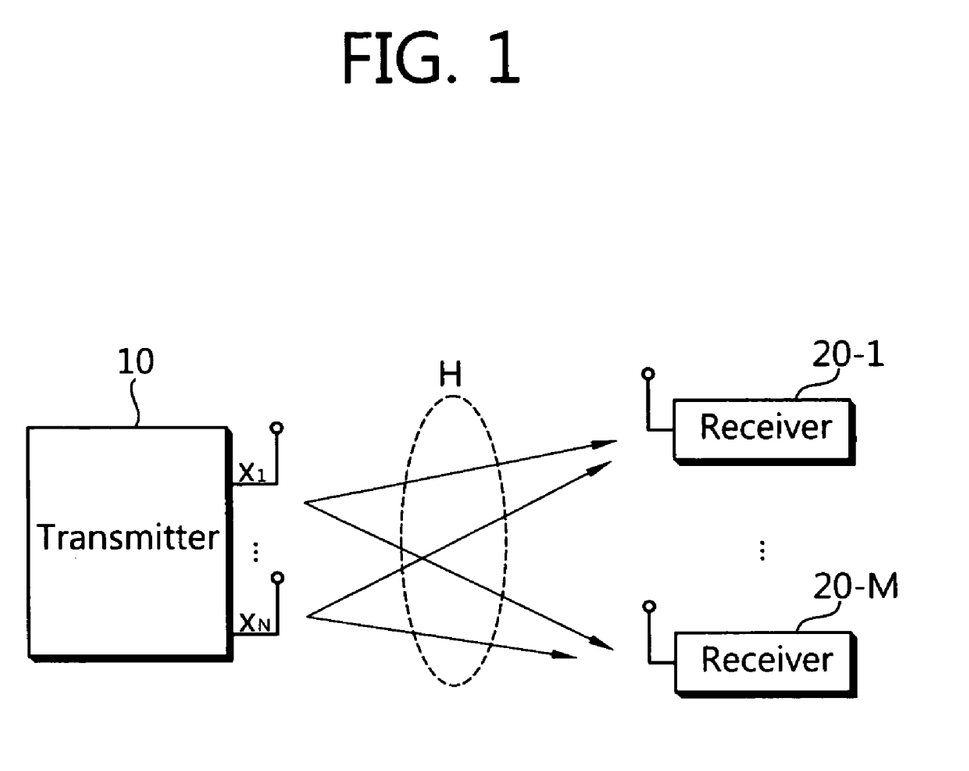
FIG. 1 is a schematic block diagram showing a wireless communication system according to an embodiment of the present invention.

FIG. 1 is a schematic block diagram showing a wireless communication system according to an embodiment of the present invention.

With reference to FIG. 1, the wireless communication system includes a transmitter 10 having N number of transmit antennas and M number of receivers 20-1, . . . , 20-M each having a single receive antenna. M and N each are a natural number.

In downlink transmission, the transmitter is a part of a base station (BS) and the receiver may be a part of a user equipment (UE). In uplink transmission, the transmitter may be a part of the UE and the receiver may be a part of the BS. Hereinafter, downlink refers to communication link from the BS to the UE, and uplink refers to communication link from the UE to the BS. The BS generally refers to a fixed station that communicates with the UE and may be called by other names such as node-B, base transceiver system (BTS), access point, etc. The UE may be fixed or mobile and may be referred to by other names such as mobile station (MS), user terminal (UT), subscriber station (SS), wireless device, etc.

A channel matrix H, a M×N matrix, may be represented by Equation 1 shown below:

$$H = \begin{bmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{M,1} & h_{M,2} & \cdots & h_{M,N} \end{bmatrix} = \begin{bmatrix} h_1^T \\ h_2^T \\ \vdots \\ h_M^T \end{bmatrix} \quad \text{[Equation 1]}$$

wherein $h_{i,j}$ is a channel from the jth transmit antenna to the ith receiver, and $h_i$ is a channel vector to the ith receiver, and $h^T$ is a transposed h.

To clarify, downlink is chosen, so the channel matrix is a downlink channel matrix. In addition, it is assumed that the receiver has a single receive antenna. However, the skilled person in the art would apply the technical idea of the present invention to uplink and a receiver having a multi-receive antenna as it is.

Figure 2:
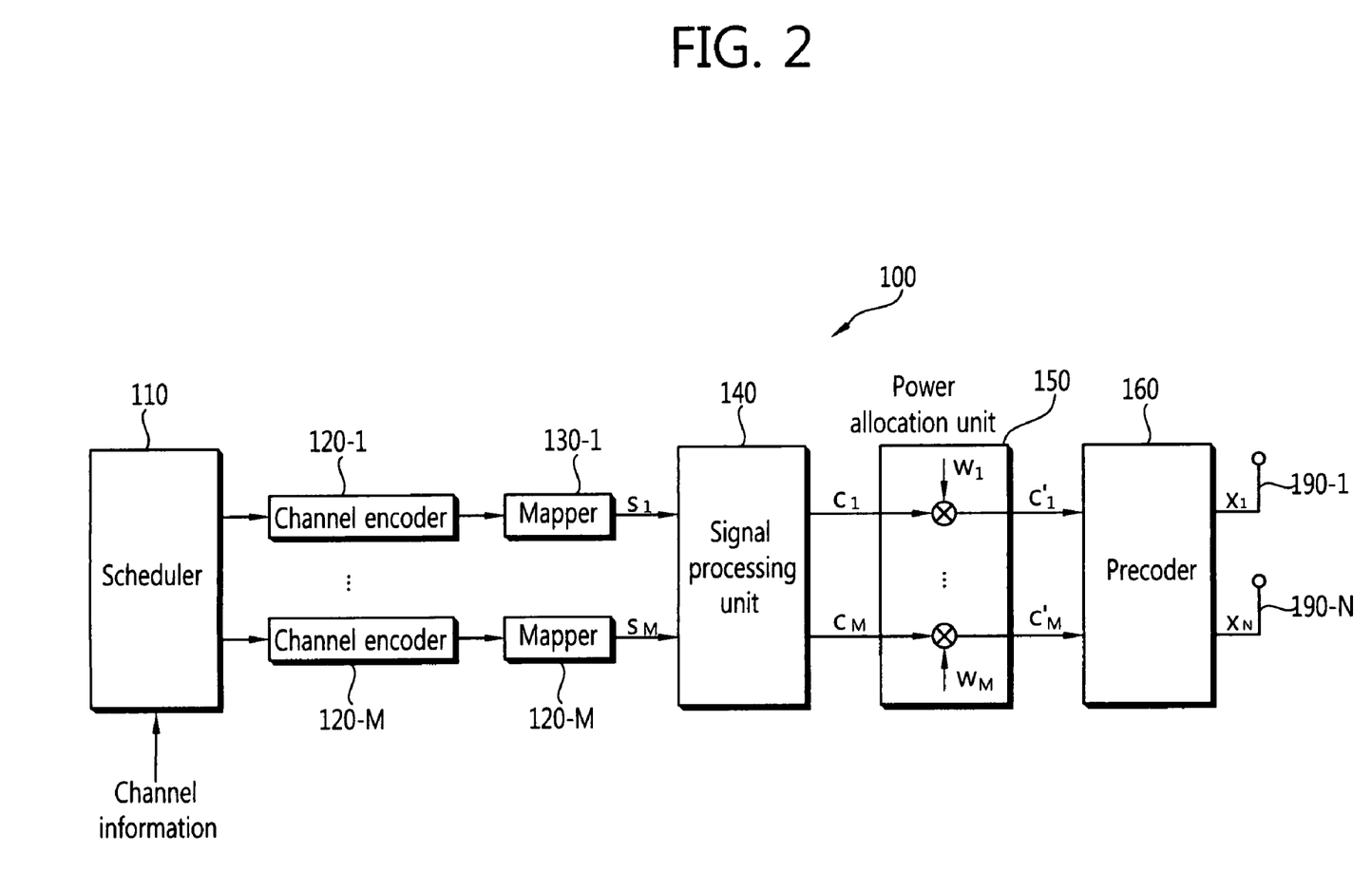
FIG. 2 is a schematic block diagram showing a transmitter according to an embodiment of the present invention.

FIG. 2 is a schematic block diagram showing a transmitter according to an embodiment of the present invention.

With reference to FIG. 2, a transmitter 100 includes a scheduler 110, channel encoders 120-1, ..., 120-M, mappers 130-1, ..., 130-M, a signal processing unit (a dirty paper coding (DPC) unit) 140, a power allocation unit 150, and a precoder 160. The transmitter 100 includes N (N>1) number of transmit antennas 190-1, ..., 190-N.

The scheduler 110 receives channel information and handles user scheduling. The scheduler 110 selects multiple users from among those in a cell and outputs M number of data streams. One or many data streams may be allocated per user.

The channel encoders 120-1, ..., 120-M encode input streams according to a determined coding scheme to form coded data. The mappers 130-1, ..., 130-M map the coded data to data symbol vectors $s=\{s_1, \ldots, s_M\}$ representing positions on signal constellation. There is no limitation in a modulation scheme, and the modulation scheme may be m-phase shift keying (m-PSK) or m-quadrature amplitude modulation (m-QAM).

The signal processing unit (the DPC unit) 140 receives the data symbol vectors s and generates signal processing vectors $c=\{c_1, \ldots, c_M\}$ processed according to a designated signal processing scheme. As the signal processing scheme, DPC is used in the present embodiment, but any other schemes known to the person in the art may be used. The power allocation unit 150 processes a power weight matrix W on the signal processing vectors to output power weighted vectors $c'=\{c'_1, \ldots, c'_M\}$. The power allocation unit 150 adjusts a reception signal-to-interference plus noise ratio (SINR). If an SINR of a particular receiver determined according to a power weight value is smaller than a threshold value, the power allocation unit 150 may not transmit data to the corresponding receiver. The power weight matrix W may be represented by Equation 2 shown below:

$$W = \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix} \quad \text{[Equation 2]}$$

wherein $w_k$ is a power weight value with respect to the kth signal processing symbol $c_k$. The power weight value $w_k$ for each receiver is used to allow the transmitter to adjust the SINR value of each receiver into a desired value. The power weight value $w_k$ is used to adjust power of interference which is not canceled from a reception signal of the kth receiver and also to adjust desired power of a transmission signal.

Accordingly, the power weight vector c' may be represented by Equation 3 shown below:

$$c' = Wc = \begin{bmatrix} w_1 & 0 & \cdots & 0 \\ 0 & w_2 & \cdots & 0 \\ \vdots & \vdots & \ddots & \vdots \\ 0 & 0 & \cdots & w_M \end{bmatrix} \begin{bmatrix} c_1 \\ c_2 \\ \vdots \\ c_M \end{bmatrix} = \begin{bmatrix} w_1 c_1 \\ w_2 c_2 \\ \vdots \\ w_M c_M \end{bmatrix} \quad \text{[Equation 3]}$$

The precoder 160 processes a precoding matrix F with respect to the power weight vector c' to generate a transmission signal vector $x=\{x_1, \ldots, x_N\}$. If the transmitter 100 includes N number of transmit antennas and there are M number of receivers, the preceding matrix F, an N×M matrix, may be represented by Equation 4 shown below:

$$F = \begin{bmatrix} f_{1,1} & f_{1,2} & \cdots & f_{1,M} \\ f_{2,1} & f_{2,2} & \cdots & f_{2,M} \\ \vdots & \vdots & \ddots & \vdots \\ f_{N,1} & f_{N,2} & \cdots & f_{N,M} \end{bmatrix} \equiv [f_1 \; f_2 \; \cdots \; f_M] \quad \text{[Equation 4]}$$

$$f_k = \begin{bmatrix} f_{1,k} \\ f_{2,k} \\ \vdots \\ f_{N,k} \end{bmatrix}$$

wherein $f_{i,j}$ is an element of the preceding matrix according to the precoding scheme. The precoding matrix F may be generated based on a channel matrix.

The transmission signal vector is transmitted via the transmit antennas 190-1, ..., 190-N. The transmission signal vector x may be represented by Equation 5 shown below:

$$x = \begin{bmatrix} x_1 \\ x_2 \\ \vdots \\ x_N \end{bmatrix} = Fc' = [f_1 \; f_2 \; \cdots \; f_M] \begin{bmatrix} w_1 c_1 \\ w_2 x_2 \\ \vdots \\ w_M x_M \end{bmatrix} \quad \text{[Equation 5]}$$

$$= \begin{bmatrix} \sum_{i=1}^{M} w_i c_i f_{1,i} \\ \sum_{i=1}^{M} w_i c_i f_{2,i} \\ \vdots \\ \sum_{i=1}^{M} w_i c_i f_{N,i} \end{bmatrix}$$

If a reception signal received by the kth receiver is $y_k$, the reception signal vector y may be represented by Equation 6 shown below:

$$y = \begin{bmatrix} y_1 \\ y_2 \\ \vdots \\ y_M \end{bmatrix} = HFc' + n \quad \text{[Equation 6]}$$

-continued $$= \begin{bmatrix} \sum_{i=1}^{M}\sum_{j=1}^{N} h_{1,j} f_{j,i} w_i c_i \\ \sum_{i=1}^{M}\sum_{j=1}^{N} h_{2,j} f_{j,i} w_i c_i \\ \vdots \\ \sum_{i=1}^{M}\sum_{j=1}^{N} h_{M,j} f_{j,i} w_i c_i \end{bmatrix} + \begin{bmatrix} n_1 \\ n_2 \\ \vdots \\ n_M \end{bmatrix}$$

wherein $n_k$ is noise in the kth receiver and n is a noise vector.

When the signal processing unit 140 performs DPC, the signal processing vector c may be represented by Equation 7 shown below:

$$c = \begin{bmatrix} c_1 \\ c_2 \\ \vdots \\ c_k \\ \vdots \\ c_M \end{bmatrix} \qquad \text{[Equation 7]}$$

$$= \begin{bmatrix} o_1(s_1; w_1; g_{1,1}) \\ o_2(s_2; c_1; w_1, w_2; g_{2,1}, g_{2,2}) \\ \vdots \\ o_k\begin{pmatrix} s_k; c_1, c_2, \ldots, c_{k-1}; w_1, w_2, \ldots, \\ w_k; g_{k,1}, g_{k,2}, \ldots, g_{k,k} \end{pmatrix} \\ \vdots \\ o_M\begin{pmatrix} s_M; c_1, c_2, \ldots, c_M; w_1, w_2, \ldots, \\ w_M; g_{M,1}, g_{M,2}, \ldots, g_{M,M} \end{pmatrix} \end{bmatrix}$$

wherein $s_k$ is a data symbol with respect to the kth receiver, $o_k(.)$ is a previously defined DPC function using $s_k$, $c_1$~$c_{k-1}$, $w_1$~$w_k$, $g_{k,1}$~$g_{k,k}$. $g_{i,j}$ is defined by Equation 8 shown below:

$$g_{i,j} = \sum_{q=1}^{N} h_{i,q} f_{q,j} = h_i \cdot f_j \qquad \text{[Equation 8]}$$

The DPC function may be defined in various manners. One example of the DPC function may be represented by Equation 9 shown below:

$$c_k = o_k(s_k; c_1, c_2, \ldots, c_{k-1}; w_1, w_2, \ldots, \qquad \text{[Equation 9]}$$
$$w_k; g_{k,1}, g_{k,2}, \ldots, g_{k,k})$$
$$= v_k - \frac{I_{ca,k}}{g_{k,k} w_k},$$
$$I_{ca,k} = g_{k,1} w_1 c_1 + g_{k,2} w_2 c_2 + \ldots + g_{k,k-1} w_{k-1} c_{k-1}$$
$$= \sum_{i=1}^{k-1} g_{k,i} w_i c_i,$$
$$v_k = r_k\left(s_k, \frac{I_{ca,k}}{g_{k,k} w_k}\right)$$

wherein $r_k$ is a sub-DPC function.

Figure 3:
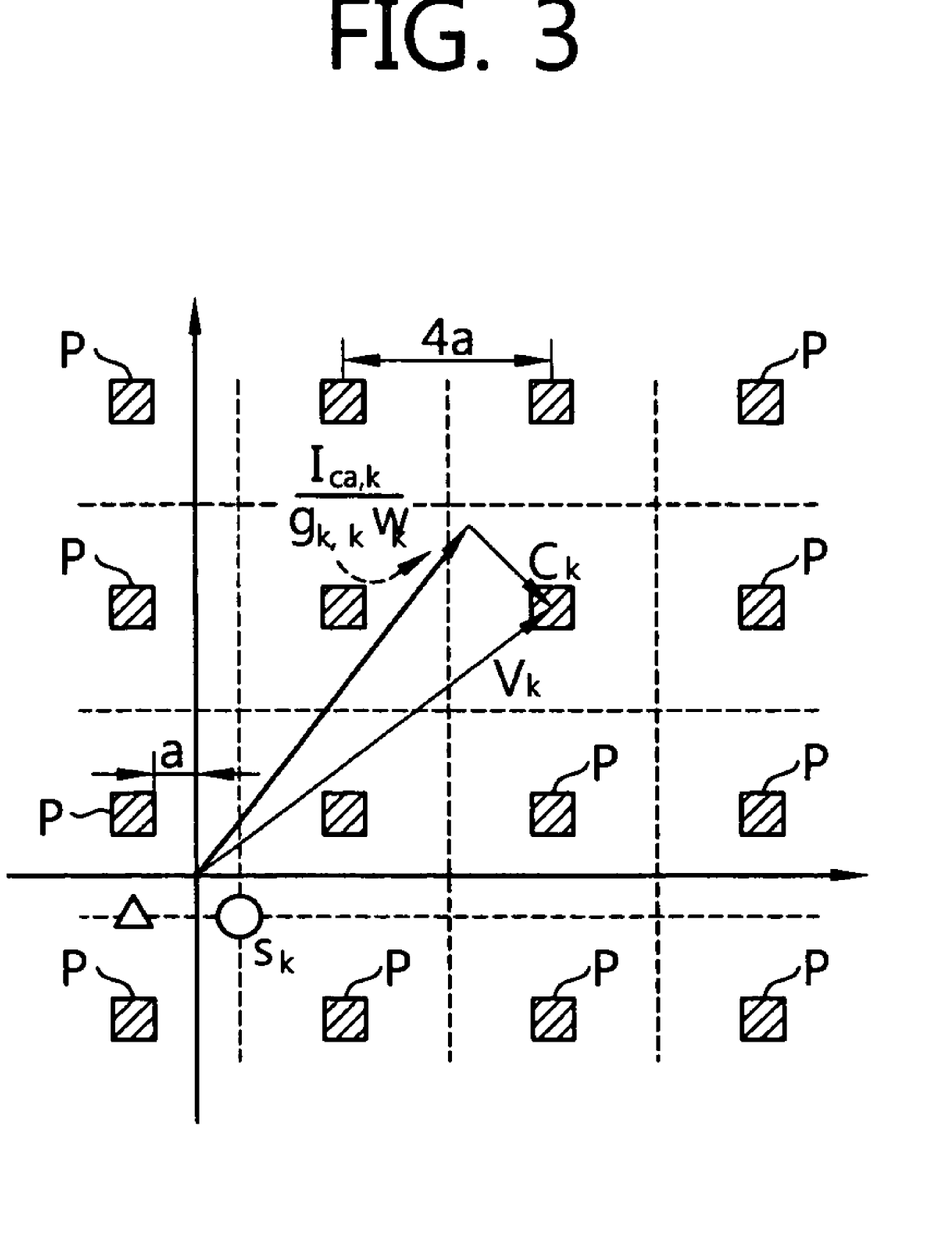
FIG. 3 illustrates one example of a sub-DPC function.

FIG. 3 illustrates one example of a sub-DPC function.

With reference to FIG. 3, in the sub-DPC function $r_k$, a point closest to $I_{ca,k}/g_{k,k} w_k$, among points (P) having equivalent information to a data symbol $s_k$ desired to be transmitted, is selected as $v_k$.

Especially, the first signal processing symbol c1 can be obtained by using Equation 10 shown below:

$$c_1 = o_1(s_1; w_1; g_{1,1}) = s_1 \qquad \text{[Equation 10]}$$

Namely, without performing DPC on the first data symbol $s_1$, the first data symbol $s_1$ itself may be used as the first DPC symbol $c_1$. In addition, the subsequent DPC symbols themselves may be also used as DPC symbols without undergoing DPC. Because only some of the plurality of data symbols are subject to DPC and those not subject to DPC are not subject to inverse DPC in the receiver, a loss caused by performing DPC can be reduced. $g_{k,k}$ is solely a function of the channel vector $h_k$, the kth receiver can estimate $g_{k,k}$ by using the estimated channel vector.

The amount of interference canceled by each receiver varies according to the order in which the DPC is performed in the transmitter. Thus, if the order of performing the DPC is appropriately adjusted, although the channel environment is the same, detection performance of each receiver can be enhanced. For example, DPC performs in the order of $s_7$, $s_M, \ldots, s_3$, not $s_1, s_2, \ldots, s_M$. The DPC order may be determined in advance and may be changed arbitrarily by the scheduler 110.

The power of the transmission signal vector x may be normalized. To this end, power normalization may be performed in the preceding matrix as represented by Equation 11 shown below:

$$|f_1|^2 = |f_2|^2 = \ldots = |f_M|^2 = \text{constant} = 1 \qquad \text{[Equation 11]}$$

In addition, power normalization may be performed on power weight matrix as represented by Equation 12 shown below:

$$\text{Trace}[WW^*] = |w_1|^2 + |w_2|^2 + \ldots + |w_M|^2 = 1 \qquad \text{[Equation 12]}$$

Accordingly, the overall transmission power of the transmitter does not change with respect to the provided signal processing vector c, as seen by Equation 13 shown below:

$$\text{Trace}[(WF)^* WF] = |w_1|^2 |f_1|^2 + |w_2|^2 |f_2|^2 + \ldots + \qquad \text{[Equation 13]}$$
$$|w_M|^2 |f_M|^2$$
$$= |w_1|^2 + |w_2|^2 + \ldots + |w_M|^2$$
$$= 1$$

In order to ensure the same transmission power at each transmit antenna, the conditions represented by Equation 14 shown below should be met with respect to every k:

$$|f_{1,k}|^2 = |f_{2,k}|^2 = \ldots = |f_{N,k}|^2 = A_k \qquad \text{[Equation 14]}$$

Figure 4:
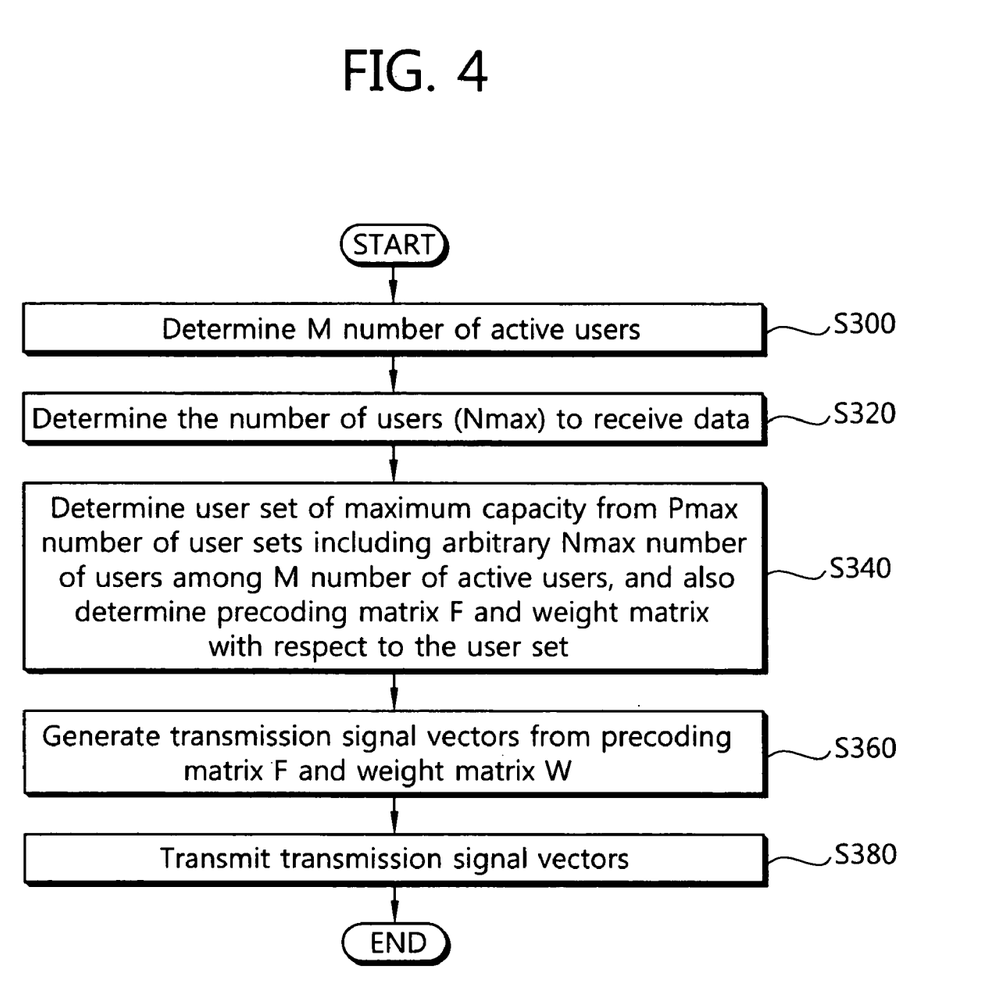
FIG. 4 is a flow chart illustrating a user scheduling method according to an embodiment of the present invention.

FIG. 4 is a flow chart illustrating a user scheduling method according to an embodiment of the present invention.

With reference to FIG. 4, M number of active users is determined in step S300. The active users refer to users in a state in which they can receive data currently.

In step S320, the number of users (Nmax) to receive data is determined. Nmax may be smaller or the same as M, may be a previously designated value, or may be a value changing each time scheduling is performed.

In step S340, a maximum temporary user set BUmax having a maximum capacity is obtained from Pmax number of temporary user sets including arbitrary Nmax number of users among the M number of active users. The set of the M number of active users may be represented by AU={$user_1$, $user_2$, ..., $user_M$}, and the set of the pth temporary users, obtained by selecting the arbitrary Nmax number of users from the set AU, may be represented by $BU_p$={$user_1$, $user_2$, ..., $user_{Nmax}$}. Because the total number Pmax of the temporary user set is the number obtained by selecting Nmax number of users from the M number of users, so it can be represented by Pmax=$_M C_{Nmax}$. The maximum temporary user set BUmax is a temporary user set having a certain criterion, e.g., a maximum capacity, among the temporary user sets. The signal processing order, the precoding matrix F, and the weight matrix W used to determine the maximum temporary user set BUmax is used as a signal processing order, a precoding matrix, and a weight matrix to generate the transmission signal vector.

The maximum capacity is illustratively used as a reference (basis) for obtaining the maximum temporary user set, but any other references such as a maximum SINR, a minimum error rate, and the like, may be also used.

In step S360, the transmission signal vector with respect to the users belonging to the maximum temporary user set is generated from the signal processing order, the preceding matrix F, and the weight matrix W.

In step S380, the transmission signal vector is transmitted to the users belonging to the maximum temporary user set.

Figure 5:
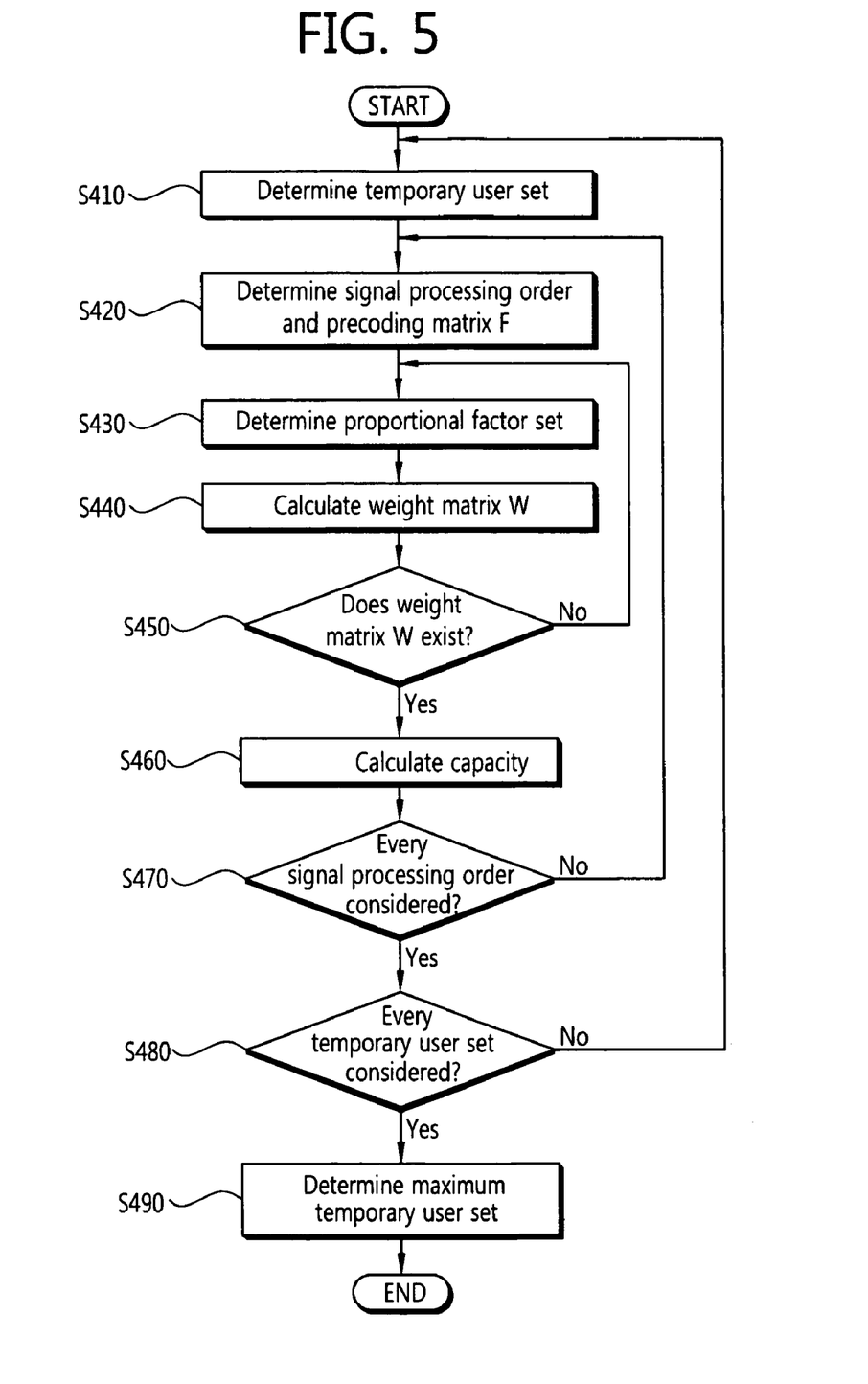
FIG. 5 is a flow chart illustrating the process of obtaining a maximum temporary user set according to one embodiment of the present invention.

FIG. 5 is a flow chart illustrating the process of obtaining the maximum temporary user set according to one embodiment of the present invention.

With reference to FIG. 5, in step S410, a temporary user set is determined. When the number of users to receive data is Nmax, a temporary user set, obtained by selecting arbitrary Nmax number of users from the set of M number of active users AU={$user_1$, $user_2$, ..., $user_M$}, may be represented by $BU_p$={$user_1$, $user_2$, ..., $user_{Nmax}$}.

In step S420, the signal processing order and the procoding matrix F to be applied to the temporary user set are determined. The signal processing order may be applied with a weight to each user. Or, when the DPC is used as the signal processing method, the signal processing order is the order of performing the DPC, and the precoding matrix F is defined according to the signal processing order.

In step S430, proportional factor sets are determined. If the total number of proportional factor sets is Rmax, the ith proportional factor set may be represented by $RU_i$={$k_1$, $k_2$, ..., $k_{Nmax-1}$}. An arbitrary proportional factor set is selected from among the Rmax number of proportional factor sets. The proportional factor $k_i$ is a weight value with respect to a reference value (i.e., SINR) of the ith user. QoS (Quality of Service) of users can be adjusted by designating or changing the ratio of scheduling reference values of the users in advance.

In step S440, the weight matrix W satisfying Equation 15 shown below is calculated:

$$SINR_1 = k_1 SINR_2 = k_2 SINR_3 = \ldots = k_{Nmax-1} SINR_{Nmax}$$ [Equation 15]

A reception $SINR_1$ with respect to the ith user belonging to the temporary user set is defined by Equation 16 shown below:

$$SINR_i = q_i(H, F, W, c, n)$$ [Equation 16]

wherein $q_i$ is a known parameter, which is a function for calculating the SINR received by the ith user by using H, F, W, c, and n.

In order to obtain the weight matrix W, a predefined condition (criterion) may be further given. For example, with the condition of Equation 12 met, transmission power of each antenna would not change regardless of the weight matrix. By adjusting the weight matrix W, users who are not to transmit data can be selected. For example, when power below a certain level with respect to the given weight value W is allocated, data is not transmitted.

In step S450, if there is no weight matrix W satisfying the given condition, the process is returned to step S430 to obtain the weight matrix W with respect to a new proportional factor set.

In step S460, if there is a weight matrix W satisfying the given condition, capacity of the users belonging to the temporary user set $BU_p$ is calculated. Although not described in the present embodiment, after the capacity is calculated, a new weight matrix with respect to any other possible proportional factor set may be obtained and corresponding capacity may be calculated. This means that capacitor with respect to every possible proportional factor set may be obtained.

In step S470, if there is a combination of signal processing orders to be considered, the process is returned to step S420 to calculate capacity with respect to the new signal processing order.

In step S480, with capacity with respect to all the signal processing orders obtained, if there is any other temporary user set to be considered, the process is returned to the step S410 to calculate capacity of the new temporary user set.

In step S490, after capacity of all the temporary user sets is calculated, a temporary user set having a maximum capacity is determined as a maximum temporary user set.

If the signal processing using DPC is employed, how to define the precoding matrix and weight matrix according to the DPC performing order might matter. Because an optimum combination can be found from a user set selected according to the DPC performing order, the system performance can be enhanced.

Figure 6:
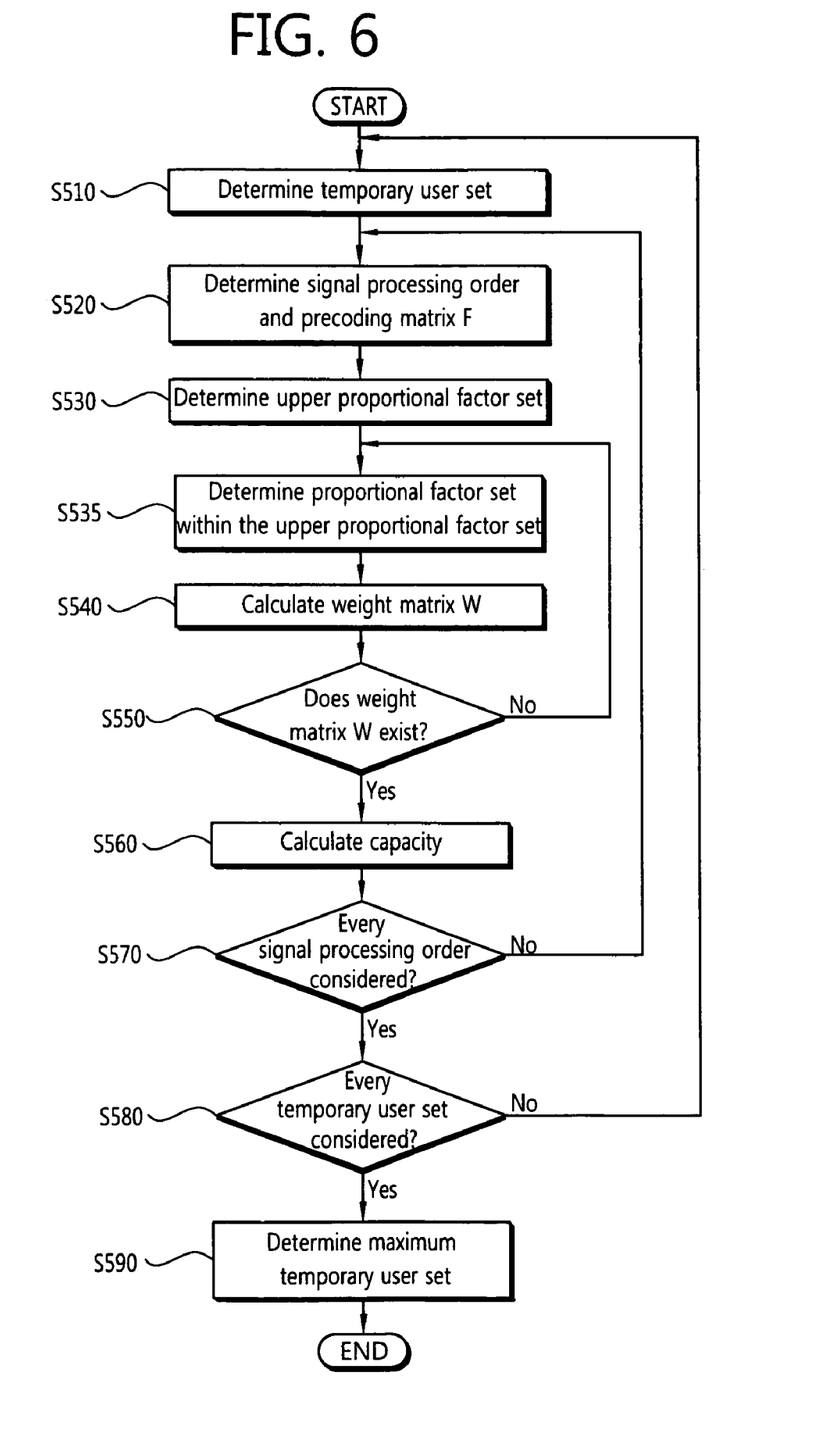
FIG. 6 is a flow chart illustrating the process of obtaining a maximum temporary user set according to another embodiment of the present invention.

FIG. 6 is a flow chart illustrating the process of obtaining a maximum temporary user set according to another embodiment of the present invention.

With reference to FIG. 6, in step S510, a temporary user set is determined. If the number of users to receive data is Nmax, a temporary user set, obtained by selecting arbitrary Nmax number of users from the set of M number of active users AU={$user_1$, $user_2$, ..., $user_M$}, may be represented by $BU_p$={$user_1$, $user_2$, ..., $user_{Nmax}$}.

In step S520, the signal processing order and the preceding matrix F to be applied to the temporary user set are determined. If DPC is used as a signal processing method, the signal processing order is the order of performing DPC and the preceding matrix F is defined according to the signal processing order.

In step S530, an upper proportional factor set to be used from among a plurality of upper proportional factor sets is determined. The upper proportional factor set may be determined according to a channel state or the number of users. The upper proportional constant set includes at least one proportional set. If the ith proportional factor set included in the upper proportional factor set is $RU_i$, the jth upper proportional factor set having Rmax number of proportional factor sets may be represented by $R_j$={$RU_1, RU_2, \ldots, RU_{Rmax}$}. The number of proportional factor sets included in each upper proportional factor set may differ.

In step S535, a proportional factor set within the upper proportional factor set is determined. If the total number of proportional factor sets belonging to the upper proportional factor set is Rmax, the ith proportional factor set may be represented by $RU_i$={$k_1, k_2, \ldots, k_{Nmax-1}$}. An arbitrary proportional factor set is selected from among the Rmax number of proportional factor sets. The proportional factor $k_i$ is a weight value with respect to a reference value (i.e., SINR) of the ith user.

In step S540, a weight matrix W satisfying Equation 15 is calculated. In step S550, if there is no weight matrix W satisfying a given condition (criterion), the process is returned to step S535 to obtain the weight matrix W with respect to a new proportional factor set. In step S560, if there is a weight matrix W satisfying the given condition, capacity of users belonging to the temporary user set $BU_p$ is calculated. Although not described in the present embodiment, after the capacity is calculated, a new weight matrix with respect to any other proportional factor set belonging to the upper proportional factor set may be obtained and corresponding capacity may be calculated. This means that capacitor with respect to all the proportional factor belonging to the upper proportional factor set may be obtained.

In step S570, if there is a combination of signal processing orders to be considered, the process is returned to step S520 to calculate capacity with respect to the new signal processing order.

In step S580, with capacity with respect to all the signal processing orders obtained, if there is any other temporary user set to be considered, the process is returned to the step S510 to calculate capacity of the new temporary user set.

In step S590, after capacity of all the temporary user sets is calculated, a temporary user set having a maximum capacity is determined as a maximum temporary user set.

The range of a power ratio may be adjusted according to the upper user set in use. This means that if the upper user set differs depending on the number of users, the power ratio can vary depending on the number of users. Within the range in which the given power ratio changes, if the number of active users is small, the power ratio may be increased, and if the number of users is large, the power ratio may be reduced. For example, it is assumed that the changing range of the power ratio is given as [tc_min, tc_max] and a power ratio is obtained-within the range. If the number of active users is small, the range of the power ratio may be increased, and if the number of active users is large, the range of power ratio may be reduced. For another example, it is assumed that a power ratio is obtained by increasing it by Δtc starting from tc_min within the changing range [tc_min, tc_max] of the power ratio. If the number of active users is small, Δtc is reduced to increase the number of cases. If the number of active users is large, Δtc is increased to reduce the number of cases.

If one of the both extremes of the changing range of the given power ratio is selected, it may be interpreted as a meaning that a corresponding user is selected or excluded. For example, it is assumed that the changing range is [tc_min, tc_max] and both extremes each are −tc_inf and +tc_inf. If the positive extreme value +tc_inf is selected, it may be interpreted that only a corresponding user is served, while if the negative extreme value −tc_inf is selected, it may be interpreted that a corresponding user is not served.

In addition, the number of proportional factor sets included in the upper user set may be increased if the number of active users is small, and may be reduced if the number of active users is large, to thereby adjust the amount of calculation.

Figure 7:
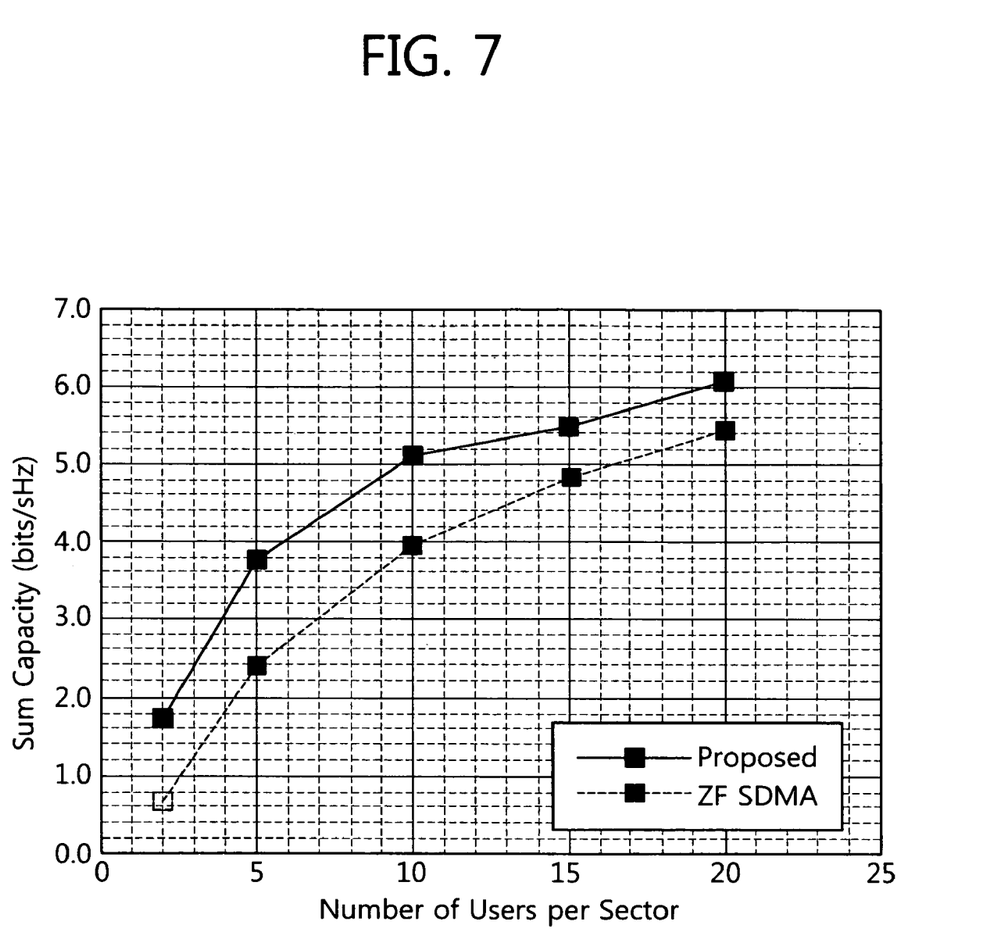
FIG. 7 is a graph of the total capacity versus the number of users in a 2×1 MIMO system.

FIG. 7 is a graph of the total capacity versus the number of users in a 2×1 MIMO system. Compared to a zero forcing-spatial division multiple access (ZF-SDMA), notably, the proposed method has a superior total capacity.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A user scheduling method comprising:
selecting temporary user sets from M number of active users;
determining a proportional factor set which is applied to a SINR (signal-to-interference plus noise ratio) of each user included in a first temporary user set among the temporary user sets;
determining a weight matrix making the SINR of each user multiplied by a proportional factor being constant when the determined proportional factor set is applied to the SINR of the each user included in the first temporary user set;
calculating capacity of the first temporary user set when the weight matrix is applied;
determining the first temporary user set as a maximum temporary user set when the first temporary user set has a maximum capacity among the temporary user sets; and
transmitting data to users belonging to the maximum temporary user set via multiple antennas by using a precoding matrix and a weight matrix with respect to the maximum temporary user set.

2. The method of claim 1, further comprising:
processing the data for the users belonging to the maximum temporary user set according to signal processing order.

3. The method of claim 2, wherein data with respect to the user belonging to the maximum temporary user set is processed by using dirty paper coding (DPC), and the signal processing order is the order of performing DPC.

4. The method of claim 2, wherein the precoding matrix is determined according to the signal processing order.

5. A transmitter comprising:
a plurality of transmit antennas;
a scheduler;
a channel encoder that performs channel encoding on the data streams;
a mapper that maps the channel-coded data to data symbols on a signal constellation;
a signal processor that performs signal processing on the data symbols to generate signal-processed symbols;
a power allocation unit that allocates power to the signal-processed symbols through a weight matrix with respect to the maximum temporary user set; and
a precoder that performs precoding on the power-allocated symbols through a precoding matrix with respect to the maximum temporary user set to generate transmit signals transmitted via the plurality of transmit antennas,
wherein the scheduler is configured for:
selecting temporary user sets from M number of active users;

determining a proportional factor set which is applied to a SINR (signal-to-interference plus noise ratio) of each user included in a first temporary user set among the temporary user sets;

determining a weight matrix making the SINR of each user multiplied by a proportional factor being constant when the determined proportional factor set is applied to the SINR of the each user included in the first temporary user set;

calculating capacity of the first temporary user set when the weight matrix is applied;

determining the first temporary user set as a maximum temporary user set when the first temporary user set has a maximum capacity among the temporary user sets; and outputting a plurality of data streams with respect to the maximum temporary user set.

6. The transmitter of claim 5, wherein the signal processing unit performs signal processing by using dirty paper coding (DPC), and the precoding matrix is determined according to the DPC performing order.

7. The transmitter of claim 5, wherein transmission power with respect to each transmit antenna is constantly uniform.

8. The method of claim 1, wherein each proportional factor in the proportional factor set is a weight value with respect to a SINR of the each user included in the first temporary user set.

9. The method of claim 8, wherein the weight value adjusts a QoS (quality of service) of the each user included in the first temporary user set.

* * * * *